United States Patent [19]

Bass

[11] Patent Number: 4,662,482

[45] Date of Patent: May 5, 1987

[54] BRAKE DISC ASSEMBLY

[75] Inventor: Richard A. Bass, Leamington Spa, England

[73] Assignee: Automotive Products plc, Leamington Spa, England

[21] Appl. No.: 754,255

[22] Filed: Jul. 12, 1985

[30] Foreign Application Priority Data

Jul. 16, 1984 [GB] United Kingdom ............... 8418010

[51] Int. Cl.⁴ .............................................. F16D 65/12
[52] U.S. Cl. ................................ 188/18 A; 188/73.38; 188/218 A; 188/218 XL; 301/6 E; 301/6 W
[58] Field of Search ...................... 188/18 A, 26, 71.4, 188/72.3, 73.2, 73.38, 205 A, 216, 218 XL, 73.31, 218 R, 218 A; 192/70.18, 70.2; 301/6 E, 6 WB, 6 W, 37 S

[56] References Cited

U.S. PATENT DOCUMENTS

| | | | |
|---|---|---|---|
| 2,077,695 | 4/1937 | Horn | 188/218 A |
| 3,022,867 | 2/1962 | Maloney et al. | 188/218 XL X |
| 3,405,784 | 10/1968 | Henry-Biabaud | 188/18 A |
| 3,542,166 | 11/1970 | Harrison | 188/218 XL |
| 3,709,561 | 1/1973 | De Biasse et al. | 301/6 E |
| 3,781,068 | 12/1973 | Brooks | 188/73.31 X |
| 4,102,443 | 7/1978 | Kohler et al. | 301/6 E X |

FOREIGN PATENT DOCUMENTS

| | | | |
|---|---|---|---|
| 688382 | 3/1953 | United Kingdom . | |
| 1238630 | 7/1971 | United Kingdom . | |
| 2104985 | 3/1983 | United Kingdom | 188/218 XL |
| 2072280 | 8/1983 | United Kingdom . | |

*Primary Examiner*—Andres Kashnikow
*Assistant Examiner*—Richard R. Diefendorf
*Attorney, Agent, or Firm*—Solon B. Kemon

[57] ABSTRACT

A brake disc assembly with fasteners for securing the disc to a wheel, together with spacers associated with the fasteners for allowing the disc limited axial play relative to the wheel, there being a holder on the disc having surfaces between which the spacers are gripped.

10 Claims, 5 Drawing Figures

BRAKE DISC ASSEMBLY

The invention relates to a brake disc assembly and is particularly but not exclusively concerned with an assembly for a motor cycle disc brake.

The assignees of the present invention have disclosed in an earlier application an annular brake disc mounted at its outer periphery with limited float or play, the float or play being however significantly less than the depth of an unworn friction pad engageable with the disc to effect braking and usefully 0.33 mm or less.

An annular brake disc mounted at its outer periphery is known from Dunlop British Pat. No. 688382, from Honda British Pat. No. 2072280, and from De Biasse U.S. Pat. No. 3,709,561. The discs of these prior disclosures are however mounted so as to prevent any float or play relative to the wheel on which it is mounted.

An axially-movable brake disc is disclosed in Maloney U.S. Pat. No. 3,022,867. The disc of this Maloney prior disclosure is used with a single-sided fixed caliper so that the disc float or play must be equal at least to the wear depth of one of the friction pads, which in the Maloney disclosure are in the form of brake liners attached to each side of the disc. A bias spring is mounted in the disc support, to bias the disc towards a "rest" position.

An annular brake disc peripherally mounted for radial expansion, that is for permitted relative movement in the plane of the disc, is disclosed in Henry-Biabaud U.S. Pat. No. 3,405,784; in one embodiment each of the connection points between a supporting crown and the disc includes one or more bolts screwed radially into the disc and provided with a sleeve which is free to slide within a hole in the crown, the distance between the bolt head and the disc being, for this purpose, larger than the thickness of the crown. The sleeve has however to be located in the disc after the disc has been positioned during assembly, and if as is usual several such sleeves are to be used, disc assembly is made more complicated; and furthermore the sleeves can become detached and perhaps the sliding surfaces dirtied during disc aassembly, and mislaid during disc assembly and replacement.

A brake disc mounted for both axial and radial float is disclosed in Pont-a-Mousson British Pat. No. 1 238 630; the disc is biased against radial float by one or more springs bolted to the disc support, the bolts in at least one of the embodiments necessarily being fitted prior to assembly of the disc and so potentially being engaged and distorted by the disc during its mounting, so complicating rather than assisting accurate placement of the disc during mounting.

According to one aspect of the present invention there is provided a brake disc assembly comprising a disc, fastening means for securing the disc to a wheel spacer means associated with the fastening means for allowing the disc limited axial play relative to the wheel and a holder on the disc having surfaces between which the spacer means is gripped.

The use of the spacer to provide limited axial play helps to overcome the problem of "run out", i.e. misalignment of the disc relative to the brake caliper, arising for instance, from misaligned mountings for the disc and caliper or upon wear. In practice, there will generally be a number of circumferentially spaced fastening means along with associated spacers and holders, and to locate the spacers on the disc itself greatly eases mounting of the disc, and reduces the likelihood of the disc being mounted without some of the spacers, either because they were not placed on the disc or because they detach during attempted disc mounting. Furthermore, a or each holder can provide a face on which the disc slides during its limited axial play, and this face may pick up dirt or grit if the holder inadvertently becomes detached during assembly of the original disc or of a replacement disc.

The brake disc assembly of the present invention is likely to find particular use in motor cycles, particularly high speed light-weight motor cycles, for which several disc replacements may have to be made—for instance to avoid braking problems due to discs which have been subjected to heavy braking and consequent high friction-induced temperatures and for which the disc brake surfaces are no longer flat.

Preferably the holder includes spaced apart legs which straddle the disc so as to grip the disc therebetween. The legs provide a simple and convenient means of mounting the holder on the disc. One of the legs may conveniently be formed to define one of said surfaces between which the spacer means is gripped. Two legs may engage one side of the disc and an intermediate third leg may engage the other side of the disc. The third leg may be formed as aforesaid to define said one of said surfaces for gripping the spacer.

Two said surfaces may be provided so as to grip the spacer at diametrically opposed positions.

In order to inhibit rattling of the disc by free axial play on the fastening means, the holder may apply an axial bias to the disc. The bias is relatively light, however, to facilitate easy axial movement of the disc on application of braking forces.

The bias may be effected by two spaced apart axial wings forming part of the holder. Preferably, two of the aforesaid legs engaging one side of the disc extent from a section of the holder intermediate the wings at positions one adjacent each wing and the third leg engaging the other side of the disc extends from the intermediate section between the other two legs. Preferably the fastening means, e.g. a bolt, extends through said holder and preferably through an aperture in said intermediate section. A said spacer gripping surface may extend from said intermediate section, e.g. in the form of a flange.

According to another aspect of the invention there is provided a holder for use with a brake disc assembly according to any of the seven immediately preceding paragraphs, the holder being locatable on the disc and having surfaces between which the spacer, in use, is gripped.

A brake disc assembly and a holder for use therewith in accordance with the invention will now be described by way of example with reference to the accompanying drawings in which.

Figure 1:
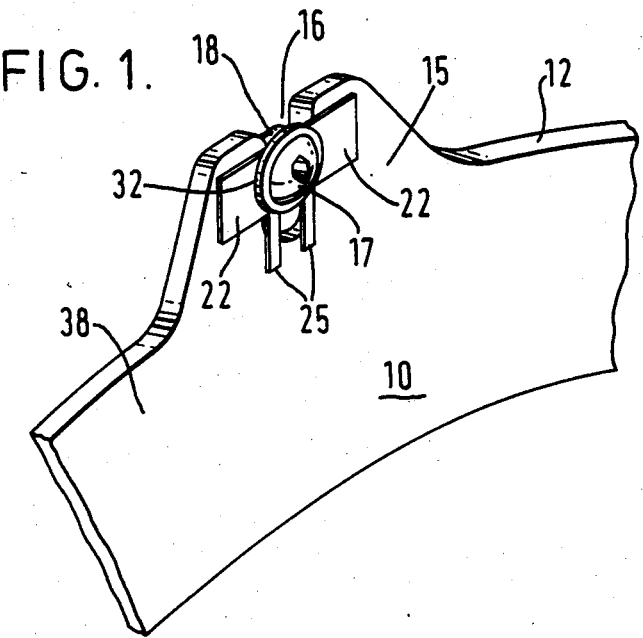
FIG. 1 is a perspective view of part of a brake disc assembly in accordance with the invention.
Figure 3:
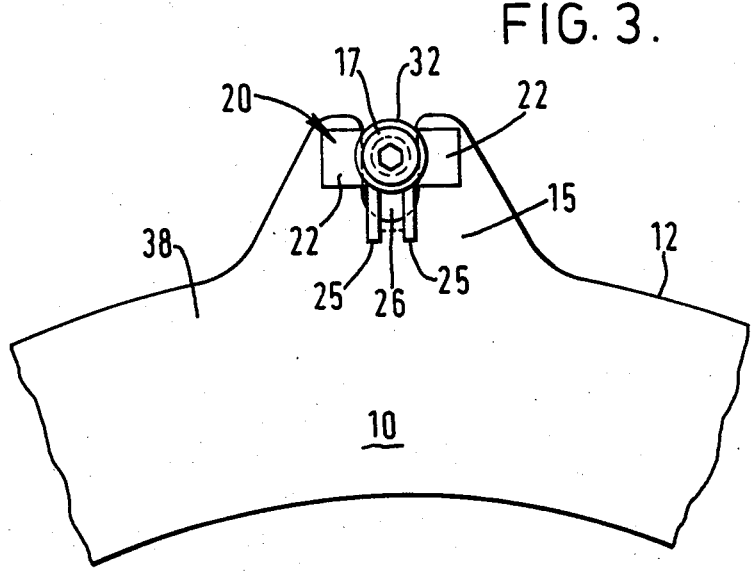
FIG. 3 is a view of part of the assembly shown in FIG. 2 looking in the direction of arrow III in FIG. 2.

An annular disc 10 having opposed sides 38, 40 has its outer peripheral margin 12 fastened to the rim 13 (FIG. 2) of a motor cycle wheel 14 through a number of circumferentially spaced radial projections 15. Each projection 15 is formed with a radial slot 16 for receiving a spacer bush 18 through which fastening means in the form of a bolt 17 passes. The bolt 17 has a shank 42, a head 46 at one end 44 and a thread 50 at the other end 48, the thread 50 screwing into a bore 19 in the wheel rim. The spacer bush 18 is of greater length than the thickness of the disc 10 and fits with working clearance in slot 16.

Figure 2:
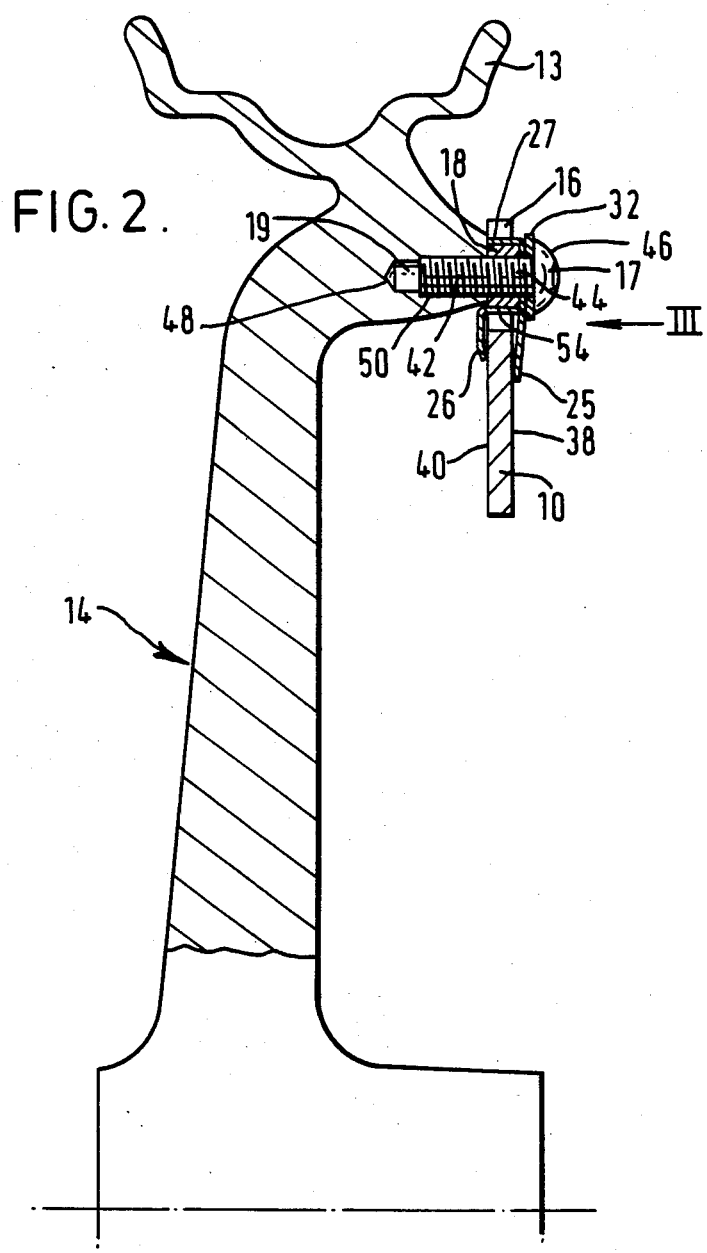
FIG. 2 is an axial cross section through a motor cycle wheel fitted with the brake disc assembly of FIG. 1.
Figure 4:
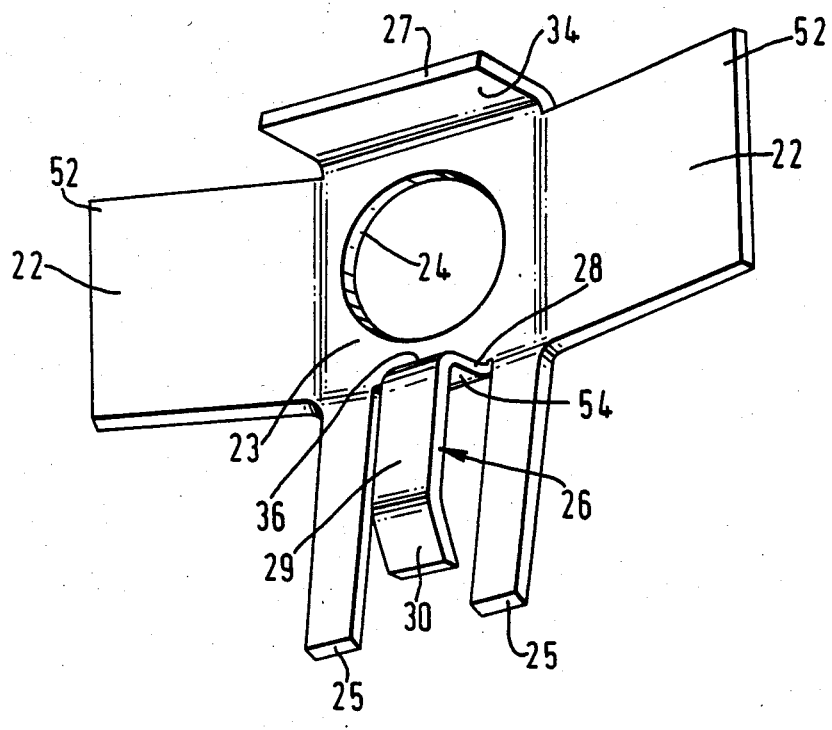
FIG. 4 is a perspective view of a resilient holder of the assembly shown in FIGS. 1 to 3.

Each bush 18 is held in position on the disc prior to location of its bolt 17 by means of a holder 20 shown in detail in FIG. 4. The holder 20 is a spring steel pressing and comprises two inclined wings 22, though in an alternative embodiment only ends 52 of the wings 22 are inclined; an intermediate section 23 formed with an aperture 24, two outer legs 25 and an intermediate leg 26,; and a flange 27 bent approximately at right angles to the intermediate section 23. The leg 26 comprises a section 28 substantially parallel with the flange 27, a longitudinal section 29 and a gripping end section 30 bent towards the space between legs 25. Flange 27 has a surface 34 parallel to and facing a surface 36 on section 28. The distance between the flange 27 and section 28 is such that the spacer bush 18 can be gripped, preferably resiliently, therebetween with its bolt receiving bore coaxial with aperture 24, the spacer bush 18 being between surfaces 34 and 36 respectively. The spacing of the legs 25,26 is such that the holder can be located on the disc 10 with the legs straddling the disc as shown in FIG. 2, the legs resiliently gripping the disc surfaces 38,40. The legs 25 are bent out of the plane of the intermediate section 23 to allow for the projection of the spacer beyond the associated surface 38 of the disc. Instead of bending the entire legs 25, the free end sections only thereof may be bent to allow for spacer projection. All of the spacer bushes 18 can be fitted to the disc in that manner prior to assembling the disc on to the rim. The shanks 42 of bolts 17 can then be inserted through the apertures 24 and bushes 18 and thread 50 screwed into the bores 19. A washer 32 is preferably located between the head of each bolt 17 and the associated holder 20. On tightening the bolts 17, the ends 52 of wings 22 engage more firmly the side 38 of disc 10 and the wings 22 tend to flatten out and resiliently bias the disc towards the rim. The length of each bush 18 facilitates axial play of the disc relative to the rim to avoid any "run out" problems and the axial bias applied by the wings 22 prevents rattling of the disc; one or more of the radially-inwardly directed faces 54 on the respective holders 20 may provide a face on which disc 10 slides during its limited axial play. The faces 54 also limit the radial play permitted to the disc 10 and so acts as an abutment face.

The flange 27 and section 28 define surfaces which tend to grip the bush 18 at diametrically opposed positions. However, it will be appreciated that the grip may be effected by surfaces arranged in different relative positions.

Although in the embodiment described surfaces 34 and 36 are parallel so as to engage complementary parallel surfaces on spacer bush 18, it will be understood that surfaces 34, 36 can have other shapes to match the ocmplementary bush surfaces. Furthermore, whilst preferably spacer bush 18 has an internal periphery which is circular in cross-section to match aperture 24, other peripheral cross-sections are possible.

The limited axial play allowed the disc will be an amount dependant upon the caliper type with which the disc is used. We prefer an axially-fixed caliper, with a permitted axial float or play for the disc 10 of up to 0.33 mm, preferably between 0.08 mm and 0.33 mm.

Figure 5:
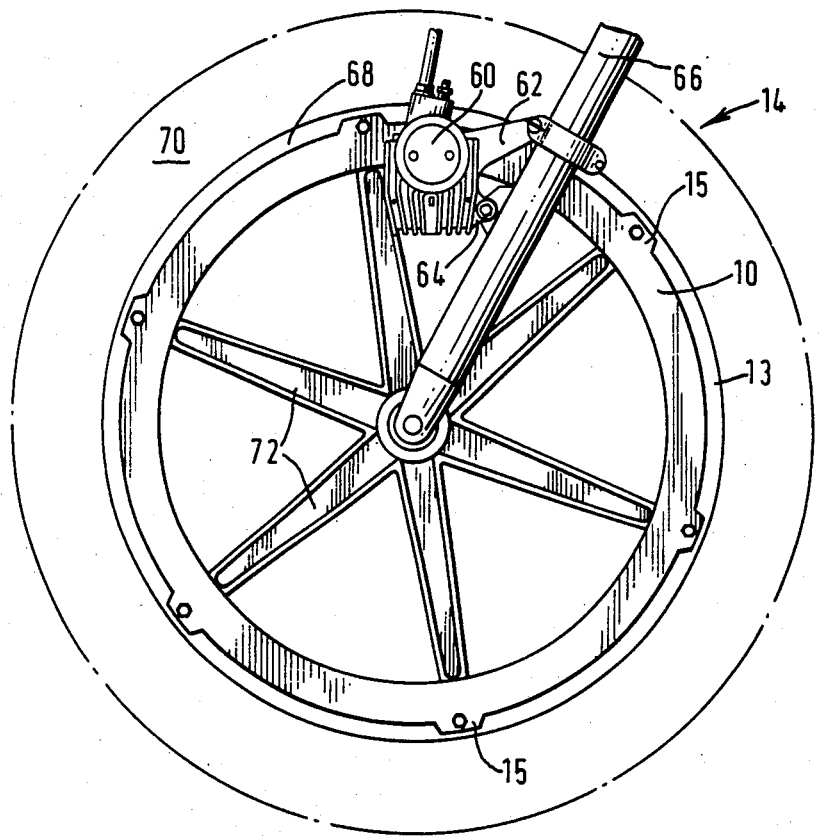
FIG. 5 is a side elevational view of a typical brake disc assembly according to the invention mounted on the rim of a motor cycle wheel, and showing a spot-type caliper associated therewith.

In a typical installation, a brake caliper 60 is mounted by arms 62, 64 to one form 66 of a motor cycle front wheel, which as seen in FIG. 5 includes a rim 68 carrying a tire 70, and supported by radial spokes 72. The brake caliper can effect gripping of disc 10 to brake the wheel.

I claim:

1. A brake disc assembly for fastening to a wheel and comprising a disc having a number of circumferentially spaced radial slots in a periphery thereof, a plurality of spacers each received in a respective one of said radial slots, fastening means passing through each spacer for securing each spacer to the wheel such that said disc is allowed limited axial play relative to the wheel, and a plurality of holders each received in a respective one of said radial slots, each holder comprising means for resiliently gripping the disc and further comprising means for holding one of said spacers in position in its slots prior to location of the fastening means and means for resiliently biasing the said disc axially toward the wheel.

2. A brake disc assembly as set forth in claim 1 wherein said means for resiliently gripping said disc comprises spaced apart legs which straddle the disc.

3. A brake disc assembly as set forth in claim 2 wherein there are provided three of said legs, two of said legs engaging one side of said disc and the third leg, intermediate of said two legs, engaging the other side of said disc.

4. A brake disc assembly as set forth in claim 1 wherein said means for holding said one spacer comprises surfaces between which said spacer is gripped.

5. A brake disc assembly as set forth in claim 4 wherein said surfaces grip said spacer at diametrically opposed positions on the spacer.

6. A brake disc assembly as set forth in claim 5 wherein said means for resiliently gripping said disc comprises spaced apart legs which straddle said disc.

7. A brake disc assembly as set forth in claim 6 wherein one of said legs is formed to define one of the surfaces on the holder between which said spacer is gripped.

8. A brake disc assembly as set forth in claim 1 wherein said means for resiliently biasing said disc towards the wheel comprises two spaced apart wings on either side of an intermediate section having a hole to receive said fastening means.

9. A brake disc assembly as set forth in claim 8 wherein said means for resiliently gripping said disc comprises spaced apart legs which straddle said disc and extend from said intermediate section.

10. A brake disc assembly as set forth in claim 8 wherein said means for holding the respective spacer comprises surfaces on said holder between which said spacer is gripped and which are substantially at right angles to said intermediate section.

* * * * *